US008352478B2

United States Patent
Buchmann et al.

(10) Patent No.: US 8,352,478 B2
(45) Date of Patent: Jan. 8, 2013

(54) MASTER DATA FRAMEWORK

(75) Inventors: Daniel Buchmann, Pfinztal (DE); Wolfgang Kalthoff, Bad Schoenborn (DE); Gerd Moser, Montreal (CA); Ralf Philipp, Dielheim (DE); Wolfgang Wiese, Darmstadt (DE)

(73) Assignee: SAP AG, Walldorf (DE)

( * ) Notice: Subject to any disclaimer, the term of this patent is extended or adjusted under 35 U.S.C. 154(b) by 1599 days.

(21) Appl. No.: 10/977,329

(22) Filed: Oct. 29, 2004

(65) Prior Publication Data
US 2006/0095439 A1    May 4, 2006

(51) Int. Cl.
*G06F 7/00*    (2006.01)
(52) U.S. Cl. ........ 707/755; 719/316; 719/328; 713/201; 705/1; 705/104.1
(58) Field of Classification Search .................. None
See application file for complete search history.

(56) References Cited

U.S. PATENT DOCUMENTS

| | | | |
|---|---|---|---|
| 6,067,548 A * | 5/2000 | Cheng ....................... | 707/103 R |
| 7,174,339 B1 * | 2/2007 | Wucherer et al. ............. | 707/102 |
| 2003/0115487 A1 * | 6/2003 | Andrews et al. .............. | 713/201 |
| 2004/0133445 A1 * | 7/2004 | Rajan et al. ....................... | 705/1 |
| 2004/0187140 A1 * | 9/2004 | Aigner et al. ................. | 719/328 |
| 2004/0210445 A1 * | 10/2004 | Veronese et al. .................. | 705/1 |

* cited by examiner

*Primary Examiner* — Thu Nga Nguyen
(74) *Attorney, Agent, or Firm* — Schwegman Lundberg Woessner P.A.

(57) ABSTRACT

Systems and techniques for providing a master data framework. The framework receives user input and automatically generates, in accordance with the input, a persistent definition of a business object type. The input can be simple declarations and need not be provided in any particular programming language. Definitions generated by the framework adhere to a same data model, regardless of the business object type they are defining. The framework allows the user to create a definition of a business object type by associating two or more definitions of other business object types. The framework provides services that can be applied, without further customization, to any definition of business object types generated by the framework. These services, for example, can be used by a calling application to instantiate business objects or to change a state of a business object instance.

23 Claims, 7 Drawing Sheets

MASTER DATA FRAMEWORK

BACKGROUND

The present specification relates to data processing and data objects.

Data objects are elements for information storage in object-oriented computing systems. Data objects can describe the characteristics of an item using a series of data fields that, for example, can correspond to described characteristics. Typically, a programmer will predefine standard object classes, referred to in the present specification as object types, that are hardcoded into a set of machine-readable instructions for performing operations. Object types are blueprints for describing individual objects using a defined set of class attributes (or properties). Instantiated objects that are members of such standard object types can be applied in a variety of different data processing activities by users, for example, customers who are largely unaware of the structure of the standard object types.

One example of a data object is a business object, which is typically used in data processing to describe the characteristics of an item or a process related to the operations of an enterprise. A business object can represent, by way of example, a document, a sales order, a product, a piece of manufacturing equipment, an employee, and even the enterprise itself.

A business object usually includes multiple layers, at the core of which is a kernel that represents the object's data. Also typically included is an interface layer that, among other things, defines an interface consisting of a set of clearly defined methods, which are said to be associated with the business object. Such methods, referred to in the instant specification as services, can be, for example, those that read, write, or delete data during run time from the kernel of the business object.

Like other data objects, a business object can be instantiated. The data of a business object instance is usually only accessible by invoking one of its associated services. The application invoking the service will be referred to in the present specification as a calling application. When executing a service on a business object instance, the calling application can change the object instance's data, that is, the object instance's state.

As with other data objects, business objects may be of a particular type. Conventionally, in a computing system of an enterprise (referred to in the instant specification as an enterprise system), one must usually define services for each business object type being used in the system, and the interface layer for a particular type of business object is typically specific to and is compatible with only the services defined for that type. Thus, one must typically define an interface layer and the services of layer whenever a new object type is being implemented in the enterprise system.

SUMMARY

The present invention provides methods and apparatus, including computer program products, for providing a master data framework. The framework receives user input and automatically generates, in accordance with the input, a persistent definition of a business object type. The input can be simple declarations and need not be provided in any particular programming language. Definitions generated by the framework adhere to a same data model, regardless of the business object type they are defining.

The framework allows the user to create a definition of a business object type by associating two or more definitions of other business object types, which can be previously created and stored in memory. To entities external to the framework, for example, a calling application, an instance of the business object type so defined appears as one business object instance.

Because it generates object type definitions that adhere to the same data model, the framework can provide services that can be applied, without further customization, to any business object definition it generates, regardless of type. The services, for example, can be used by a calling application to instantiate business objects or to change a state of a business object instance. The services of the framework can perform other tasks, as will be described below.

In one general aspect, the invention features a computer program product, tangibly stored on machine readable medium, for providing a master data framework. The product includes instructions operable to cause a processor to receive information describing a business object type. The product includes instructions to, in response to user input, create a definition of the business object type. The definition is in accordance with a data model usable for defining different business object types. The data model is a standard data model used in an enterprise system.

In another general aspect, the invention features a computer-implemented method, which includes receiving information describing a business object type. The method includes, in response to user input, creating a definition of the business object type. The definition is in accordance with a data model usable for defining different business object types. The data model is a standard data model used in an enterprise system.

In another general aspect, the invention features a master data framework that includes a first component configured to receive information describing a business object type. The framework includes a second component configured to create, in response to user input, a definition of the business object type. The definition is in accordance with a data model usable for defining different business object types. The data model is a standard data model used in an enterprise system.

The invention can be implemented to realize one or more of the following advantages. A user without programming expertise can generate definitions of business object types. Such a user need only make simple object declarations, for example, declarations associating previously created definitions of business objects types. Programming errors can thus be reduced or eliminated.

Business objects types defined by using the framework have a collection of readily available services regardless of business object types. To provide a service that is executable on the business objects, a user need only associate the service with the business objects. The user need not define services for each business object type.

Furthermore, services associated with a business object need be implemented only once, and one need not define interfaces and services for each type of business object implemented in an enterprise system. Changes to services can be effected centrally within the framework. Although the system provides the described features for the implementation of services, the system is flexible and does not, however, require one to use these features to implemented services. That is, it is possible to define interfaces and services for each object type and, thus, each object type can have its respective interfaces and services. One implementation includes all of the above described advantages.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
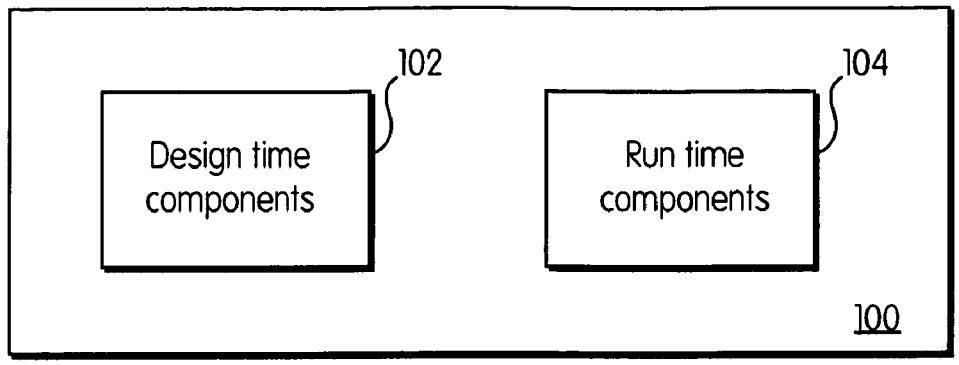
FIG. 1 shows a master data framework in accordance with the invention.

As shown in FIG. 1, a master data framework 100 includes one or more design time components 102 and one or more run time components 104. Design time components 102 are those used during design time, a period in which business object types are defined as necessary, for example, to accommodate the specific data processing activities of an enterprise system. At least one of the design time components is configured to generate the above-described definitions in accordance with user input and, furthermore, such that the definitions adhere to a same data model, which will be described below. The framework can include one or more services that facilitate design time tasks. Run time components 104 are those used during run time, a period in which applications call on services of the framework 100, for example, to instantiate data objects and access or change a state of the instantiated data objects. As will be further described below, run time services use semantics supplied by a calling application as needed to instantiate business objects, or access and/or change states of business object instances. Table 1 below provides examples of services that can be implemented. Alternatively, fewer or additional services are implemented.

Alternatively, the framework 100 can include one or more components that performed both design time and run time tasks. In this case, the framework can include a single engine operable to performed all of the above tasks.

In one implementation, the framework is a data management Layer ("DML"), which is available (as a part of MDM version 3.0) from SAP AG of Walldorf, Germany.

TABLE 1

| Service | Brief description of possible use(s) |
|---|---|
| Persistency handling | Interface with databases, e.g., table locking, synchronous and/or asynchronous updating, and buffering. |
| Transaction control | Define logical units of work, trigger saving and/or discarding of runtime changes, lock data objects, and unlock data objects. |
| Deletion | Physically remove data objects from a database, and mark a data object with a deletion flag. |
| Hierarchy checks | Ensure that a strict hierarchy or network is free of cycles (which are direct or indirect self references). |
| Status management | Provide status schema for data objects with transition rules in status net. A data object can have several status at the same time possible (e.g., new and locked). |
| Message handling | Collect error and/or success messages, e.g., for error reporting on UI, and save messages to protocol database. |
| Text handling | Check locale, and text type settings. |
| Extensibility | Change and/or extend object type definitions (which can be freely done at any time). |
| Administration data | Log time stamp of creation and/or last change of a data object type and/or segments of a data object type, log user(s) effecting the creation and/or change. (This service can be useful for auditing tasks.) |
| Authority concept | Assign maintenance authorities to users dependent on object type, and refine by authority checks on object instance level. |
| Distribution services | Effect Distribution proxy and/or message type, inbound and/or outbound processes, key mapping, matching and/or merging, object staging, object structure explosion, registration for distribution, and serialization. |
| UI | Provide UI(s) that reflect the object model and operate APIs, and provide help for inputting values wherever value entry is required. |
| Owner/namespace | Implement ownership feature. Object instances or object type segments can have an owner (e.g., an organization, or an application) that controls the change of those object instances or object type segments. For object instances, the owner is specified by adding an additional key field (and it is possible to have a same external key for objects belonging to different owners). |
| Change Management | Evaluate and assign complex validities to states of data objects and provide services to build valid states. Can be |

TABLE 1-continued

| Service | Brief description of possible use(s) |
|---|---|
| | used to control maintenance and release processes (for specifying, e.g.., which user is allowed to change which object using which change request). |
| Simple validity | Evaluate validity based on time dependency, e.g., by evaluating date-from and/or date-to fields. (This service is similar to but less complex than the above-described change management service.) |
| Change history | Provides history tables for logging all changes and an ability to reconstruct the state of an object for a given time in the past (useful for auditing purposes). |
| Classification | Assign object to classification classes, and valuate properties of classes. Classification may also use standardized classification schemes (e.g., UC/CNET). |
| Search for objects | Search for objects by information contained in any object part or object relations, formulate complex search criteria (e.g., AND/OR, exclusive search, pattern search, and interval search). Also search for objects by using a search engine (e.g., Google-like searches). |
| Reporting | Use object data for reporting purposes (multi-dimensional aggregation and analysis including graphical presentation of results). |
| Document management | Attach documents of any type (e.g., text, pictures, movies) to data objects. |
| Where used list | Run a where-used-list for all places where an object instance is used/referred. |
| Versioning | Manage several versions of an object (the framework still knows that the different versions refer to a single object). |
| Group | Grouping data objects, e.g., for search purposes. |
| Archiving | Remove obsolete data from the operational data base and put it to an archive file (e.g. because it must not be completely deleted according to some laws). |
| Workflow | Use data objects in workflows, e.g., for approval processes (approval can be contingent, for example, on the particular user who is creating and/or changing the object, and/or on one or more rules other users have to approve for a particular action before the action becomes effective). |
| Draft saving | Save incomplete and/or inconsistent data but let it not become operational (processes will run on the current active, consistent state). Ensure consistency on activating the draft. |
| Comparison of objects | Compare objects including all object parts, return differences down to attribute level. |
| Mass change | API and UI for executing the same change (e.g., replace A by B, or add 3 everywhere) on many objects by a single action instead of maintaining each object on its own. |

Figure 2:
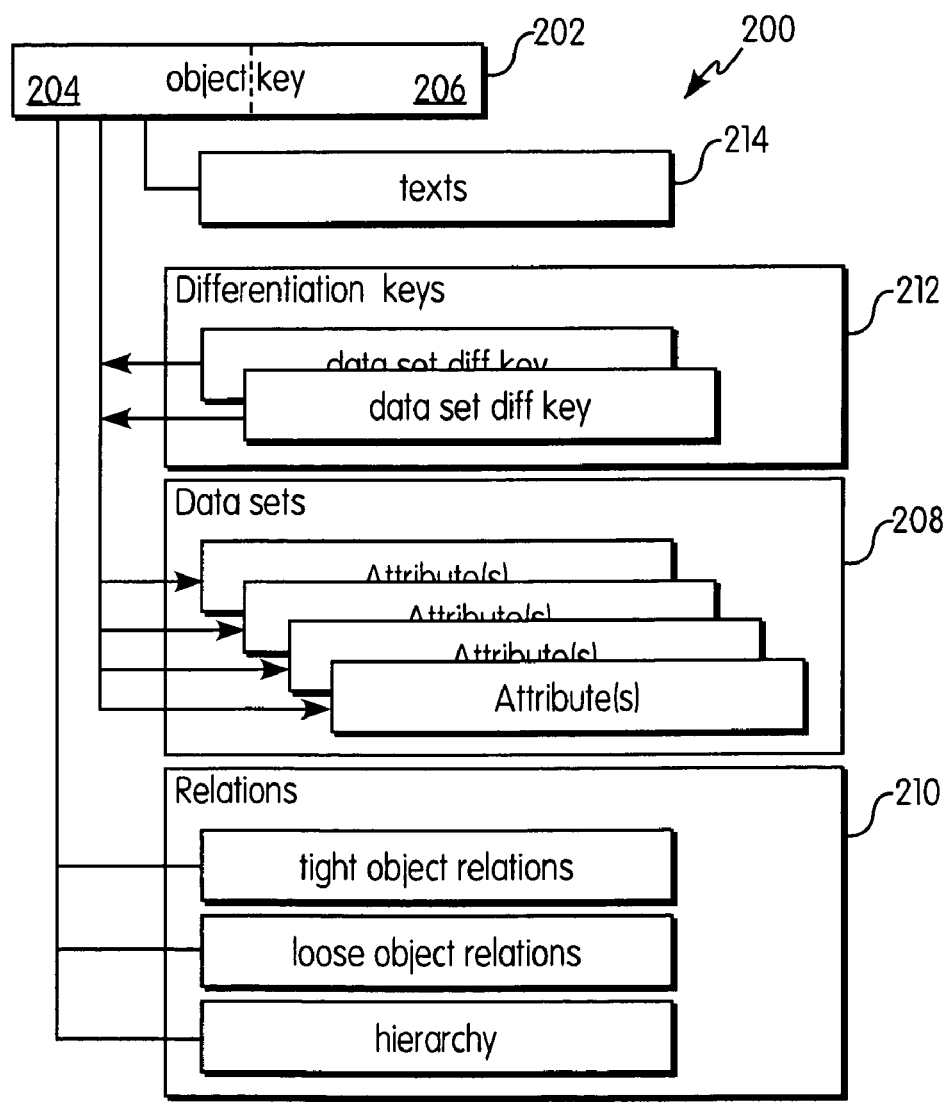
FIG. 2 shows a data model used by the framework to create definitions of business object types.

FIG. 2 shows a data model 200 used by the framework 100 to create definitions of business object types. Object type definitions generated by the framework adhere to the data model, regardless of object type. As can be seen, the data model requires that each definition includes an object key 202 that is unique to the definition (and, hence, to the business object type the definition defines). The object key can be any combination of a name, a description, or other information that can be used to uniquely identify the current business object. The object key can be received from user input or it can be assigned by the system without user input. In one implementation, the data model requires that the object key 202 includes two portions, an external portion 204 and an internal portion 206. The external portion 204 is an external key that includes one or more key fields, which can be, for example, a name of the business object type, a version of the business object type, or a group to which the business object type belongs. The internal portion 206 is a globally unique identifier ("GUID") that is accessible to at least components internal to the framework.

The data model 200 requires that each definition includes a data set component 208 that is associated with the above-described object key 202 and, furthermore, describes the attributes of a business object type, the data type for each attributes, and any syntax requirements for each attribute. The data set component 208 can specify, for example, that a particular business object type includes a first attribute called geographic location and a second attribute called coordinates. The data set component 208 can further specify that the data types of the first and second attributes are text and numbers, respectively. A syntax requirement for the second attribute can be, for example, a rule that does not allow data values other than numbers. Entry of a character string, for example, would not be permitted for the second attribute, which requires number values. In one implementation, the data set component is implemented by using Set Types, which is a software tool provided by SAP AG of Walldorf, Germany to describe a grouping of one or more attributes.

The data model 200 requires that each definition includes a relations component 210 that is associated with the object key 202 and, furthermore, describes one or more relations a business object instance may have with other business object instances. A relation, in general, associate two object type definitions and, thus, specify the relationship between an object instance of one of the two object types and an object instance of the other of the two object types. An object type definition can include more than one relation and, thus, more than two definitions can be associated.

As can be seen, there can be at last three types of relations, which are called tight, loose, and hierarchy relations. Objects instances associated by a relation have a parent-to-child relationship, in which the child object instance is a component of the parent object instance. By way of example, in a relation between object instances that represent an employee and an address, the former is the parent object instance and the latter is a child object instance. The parent object instance can be further associated with other objects instances, as either a parent or a child.

In a tight relation, the associated object instances together form a complex object. The child object instance does not appear, to entities external to the framework, for example, a calling application, as an individual business object instance. It appears as a component of its parent object instance. The child object instance, thus, need not have an external key, need not be externally locked, i.e., protected from a change in state, need not be posted or published to entities external to the framework. One cannot access information of the child object instance without going through the parent object instance. In order to access such information, one is generally required to retrieve the parent object instance. In a sense, the parent object instance can control when and how the child object instance is changed.

In a loose relation, in contrast, the child object instance can appear as it own individual object instance. Information regarding the child object instance can be arbitrarily accessed without going through the parent object instance. The child object instance, thus, may need an external key, a lock, and to be posted or published external to the framework.

A hierarchy relation is generally a tree-like structure with branches relating one object instance to another. In one implementation, the relations component 210 is implemented by using Interlinkages, a software tool provided by SAP AG.

In the instant specification, an object type that includes a tight relation is referred to as a complex object type and an object instance of a complex object type, which instance is formed by associating object instances with a tight relation, is referred to as a complex object instance. Object definitions that do not include a tight relation are referred to as simple object definitions, and object instances that do not have a tight relation (but may include a loose relation) are referred to as simple object instances. A complex object type is created by defining a tight relation between two object types (which can be complex or simple).

In one implementation, the framework is aware of and builds only simple object instances. At run time, it is an API layer (e.g., the API layer 804 of FIG. 8) that evaluates whether a definition of an object type includes a tight relation to other object types and builds the complex object instance from the component object instances. (The framework simply generates the simple object instances that make up the complex object instance.) The complex object type can be described with only a tight relation attribute and is simply a virtual construct. In tables where object types are listed, there are no entries for complex object types.

Optionally, the data model 200 specifies that each definition includes a differentiation key component 212 that is associated with the object key 202. The component 212 specifies which differentiation key can be used for an object instance. A business object type can include attributes that require different data values for different conditions. For example, a business object type representing a product can include an attribute that is an identification for a storage location, and the data values that are valid for this attribute can vary from manufacturing plant to manufacturing plant. A differentiation key is typically used to implement different variations of instances of the business object type that occur for different conditions, for example, the described example involving the storage location identification. In one implementation, the differentiation key component 212 is implemented by using Linkhandler, a software tool provided by SAP AG.

Optionally, the data model 200 specifies that each definition includes a text component 214 that is associated with the object key 202. The text component describes the type of text that a business object type can include.

Figure 3:
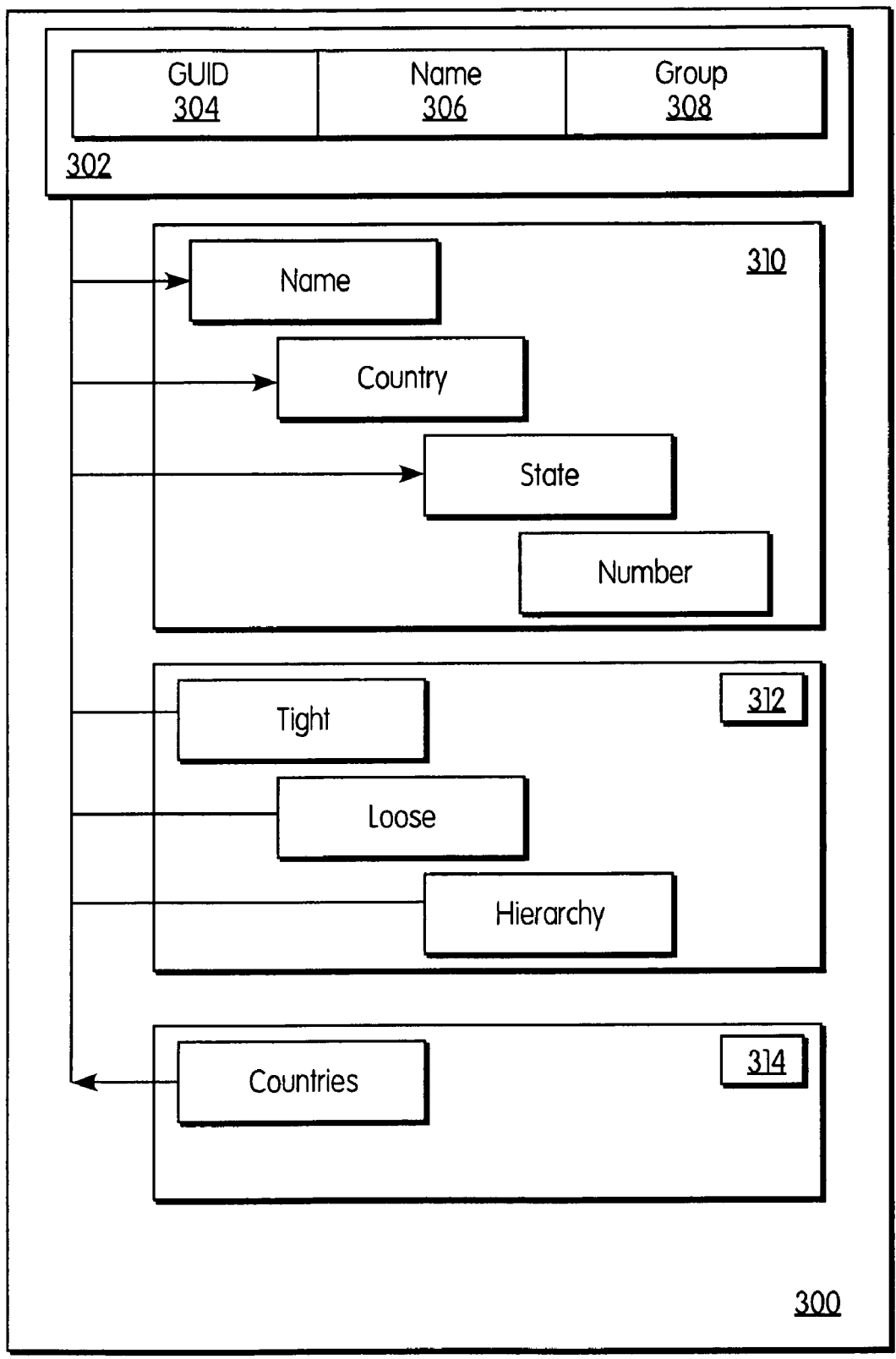
FIG. 3 is a block diagram depicting an example definition created by using the framework.

FIG. 3 is a block diagram depicting an example definition 300 created by using the framework 100. The definition 300 is of a business object type representing oil wells. In general, the definition describes what is possible and allowed for object instances representing an oil well. The definition 300 does not include data values.

As can be seen, the definition 300 adheres to the above described data model. The definition 300 includes an object key component 302 that includes a field 304 for a GUID, which is an internal component of the key. The object key component 302 also includes an external component 304, which includes two key fields 306 and 308 for the NAME and GROUP of the definition, respectively.

The definition 300 includes a data set component 310, which specifies that business objects of this type include four attributes: NAME, COUNTRY, STATE, and NUMBER. The component 310 also specifies the type of data values that can be used for each attributes. An alphanumeric string can be used for the attribute NAME, an alpha string can be used for the attributes COUNTRY and STATE, and numbers can be used for the attribute NUMBER. Additionally, the component 310 specifies syntax requirements for the data values for each attributes. The NAME and COUNTRY attributes share a same syntax requirement, which limits the length of their strings to less than 25 characters. The syntax requirement for the attribute STATE militates that the length of the string be two characters long. The syntax requirement for the attribute NUMBER does not allow negative numbers.

The definition 300 includes a relations component 312, which specifies that any combination of three relations, tight, loose, and hierarchy, are allowed. Furthermore, the component 312 specifies that attributes describing each type of relation are also allowed. Attributes of a relation can, for example, describe inheritance characteristics of a relation, describe the nature of a relation between two objects, and describe an ordinal counter for relations (when there are several relations of the same type being used for a business object).

The definition 300 includes a differentiation key component 314 that, in the instant example, specifies that a differentiation key for distinguishing countries can be use. Such a differentiation key may be needed, for example, to indicate that for countries other than the United States, the attribute STATE is not needed.

Figure 4:
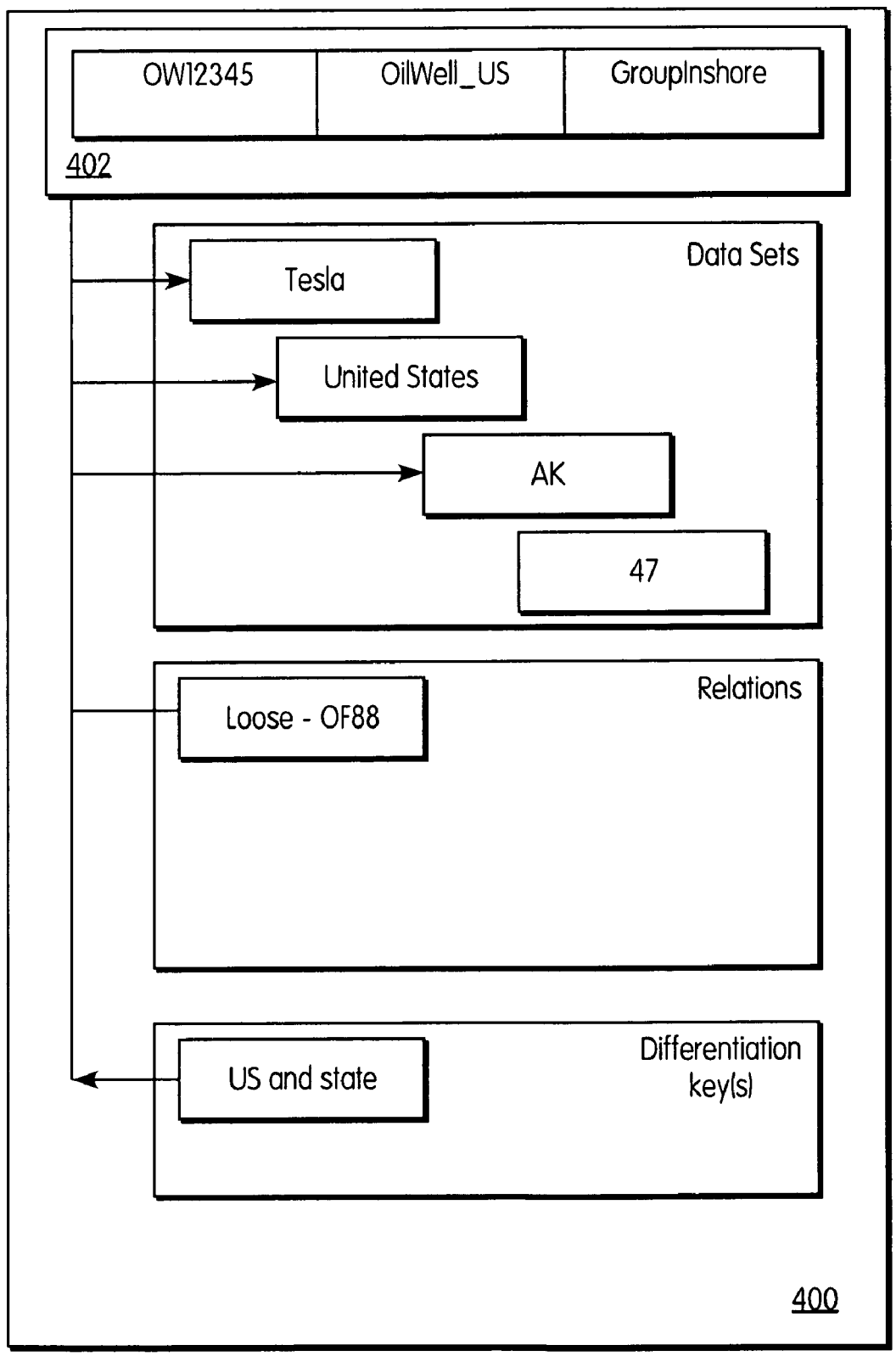
FIG. 4 is a block diagram of an example instance of a business object type.

FIG. 4 is a block diagram of an example instance 400 of the above-described business object type. Note that unlike the definition 300, the instance 400 includes data values. The object instance 400 includes an object key 402 that includes a GUID having the value OW12345. The object key 402 also includes an external key, which has the value OilWell_US_GroupInshore.

The business object instance 400 also includes values for the above-described four attributes. The values for the NAME, COUNTRY, CITY, AND NUMBER attributes are: Tesla, United States, AK, and 47, respectively.

The business object instance 400 also includes a loose object relation to an object instance that has a GUID of OF88 and that represents an oil field. In particular, the business object instance 400 represent an oil well that is located in an oil field, which is represented by the business object instance having the GUID value of OF88.

The business object instance 400 further includes one differentiation key that distinguishes the business object types representing oil wells located in the United States from those located in other countries. The business object types representing oil wells located in countries other than the U.S. do not have the attribute STATE.

Figure 5:
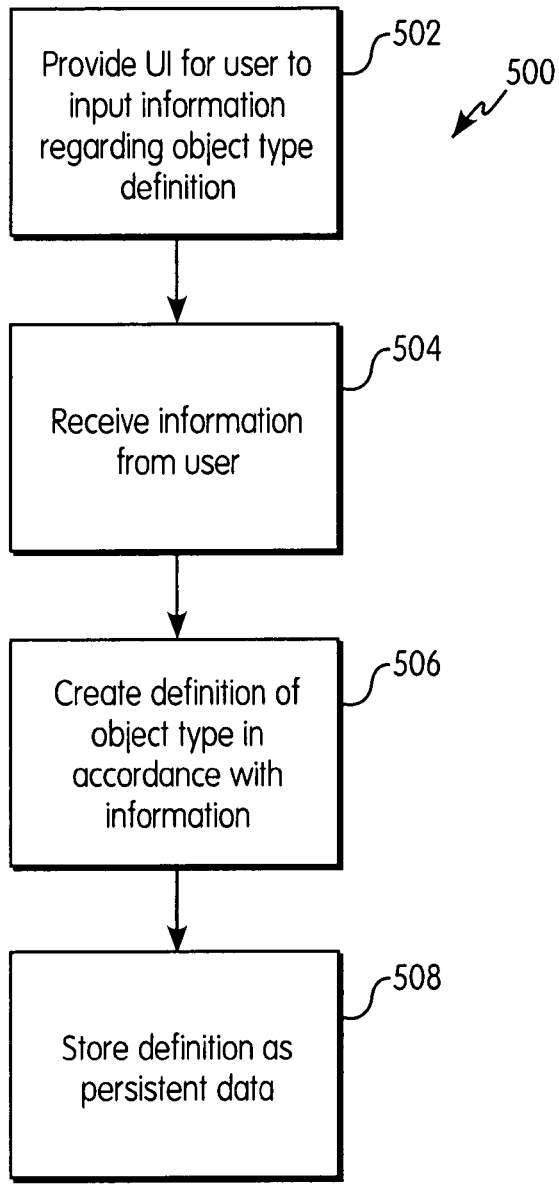
FIG. 5 shows a process for creating a definition for a business object type.

FIG. 5 shows a design time process 500 for creating a definition for a business object type. Process 500 can be performed, for example, by one or more components of the above-described framework 100.

The framework 100 provides a user interface that allows a user to provide information needed to create a definition that adheres to the above-described data model (step 502). In general, the information needed includes a description of the object key, attributes, and relations. Note that no data values are required to perform the process 500. The interface, which can be graphical, includes fields for receiving the needed information. Optionally, the fields can include pull down menus listing selectable elements of an object type definition.

The interface can include one or more tables having cells, in which the user can input the required information. Alternatively, the interface can include two or more windows, a first of which represents the business object type being defined, and a second or more of which include elements of a business object type (for example, keys, standard attributes, and relations). The interface allows the user to drag and drop selected elements into the first window and thereby define a business object type.

Figure 6:
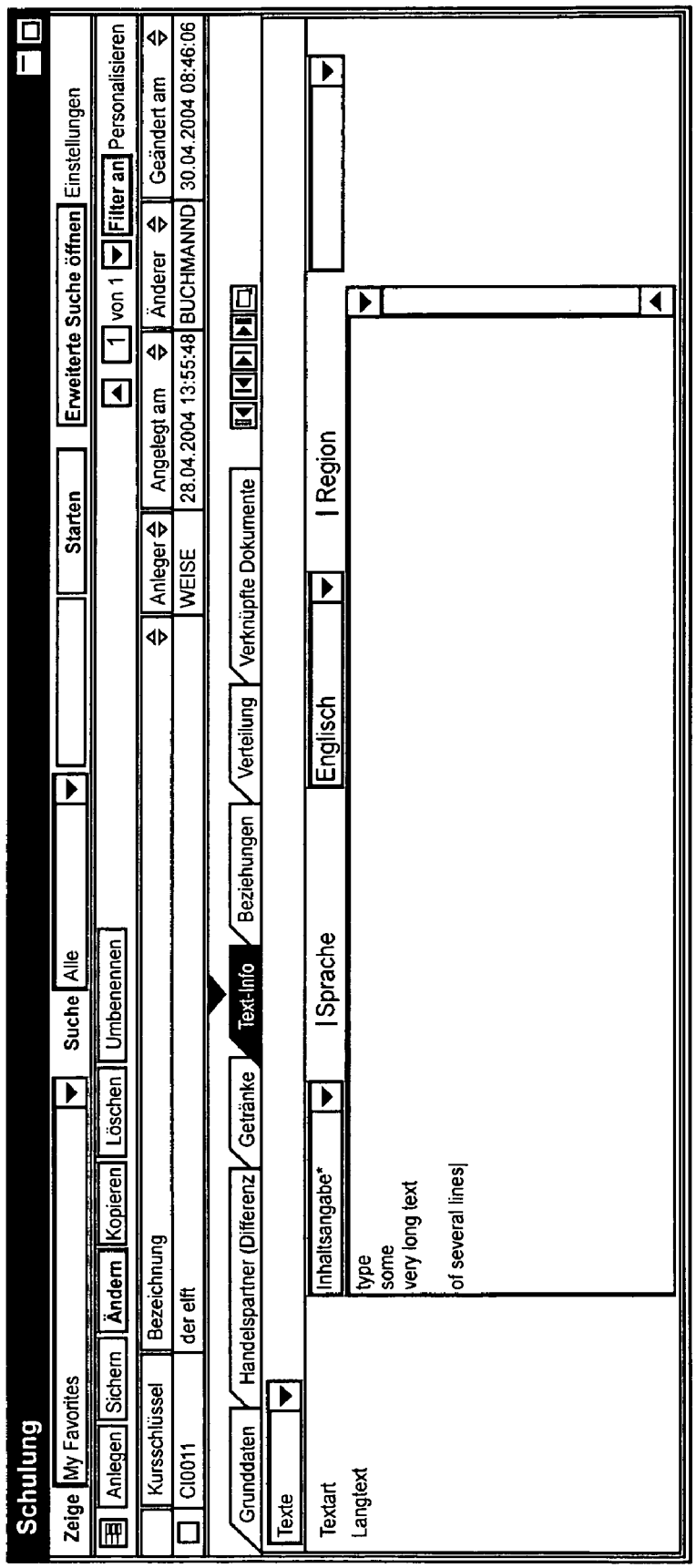
FIG. 6 shows an example of a user interface for creating a definition of a business object type.

Optionally, the framework 100 can provide, through the interface, a wizard for creating a definition. The wizard prompts the user for the information needed for the framework 100 to create a persistent definition of a business object type. FIG. 6 shows an example of the user interface.

As shown in FIG. 5, the framework 100 receives, by user input through the user interface, the information needed to create a definition that adheres to the above-described data model (step 504). In general, such information describes what is possible and allowed for instances of the object type. The information can be simple declarative statements or some graphical equivalent (for example, the above-described drag and drop and field completion techniques).

The framework creates a persistent definition of a business object type in accordance with information received from the user input (step 506). The definition is organized in accordance with the above-described data model 200, which is standard for all definitions created by the framework. Creating a persistent definition includes generating the data representing the definition. The portion of the engine that generates this data, also known as a persistency handler, can be used to generate all definitions, regardless of the type of business objects they represent. Such an advantageous result can be achieve because the framework uses a standard data model for its definitions.

The framework stores the definition in memory (step 508). In particular, the framework stores the data representing the definition in memory, which is a data store that is accessible to the framework 100.

The framework can associate one or more services with a business object type. Such associations can be made in accordance with user input. There can be a default set of services that is associated with every business object type. The framework, in one implementation, has a service architecture, and services with which the framework links, and not the framework itself, store data, including the above-described definitions for business object types and information describing any association between object types and services.

Alternative to the framework generating persistent data that represents definitions of object types, the framework can include an interface to existing database tables, which typically do not have or is required to have exactly the same name, structure, fields, or data types as would be implemented if the framework were to generate persistent data representing definitions. A mapping between the data of such tables and the data representing the framework definition can be implemented such that the table fields can be, for example, read, inserted, updated, and deleted through the interface. It is sufficient that the tables include the needed information in one form or another because the described mapping can be used to obtain the needed information. Moreover, the tables can be located in a database system not previously used by the framework and executed by a computing device that is remote from one executing the framework (but accessible to the framework through a network).

Figure 7:
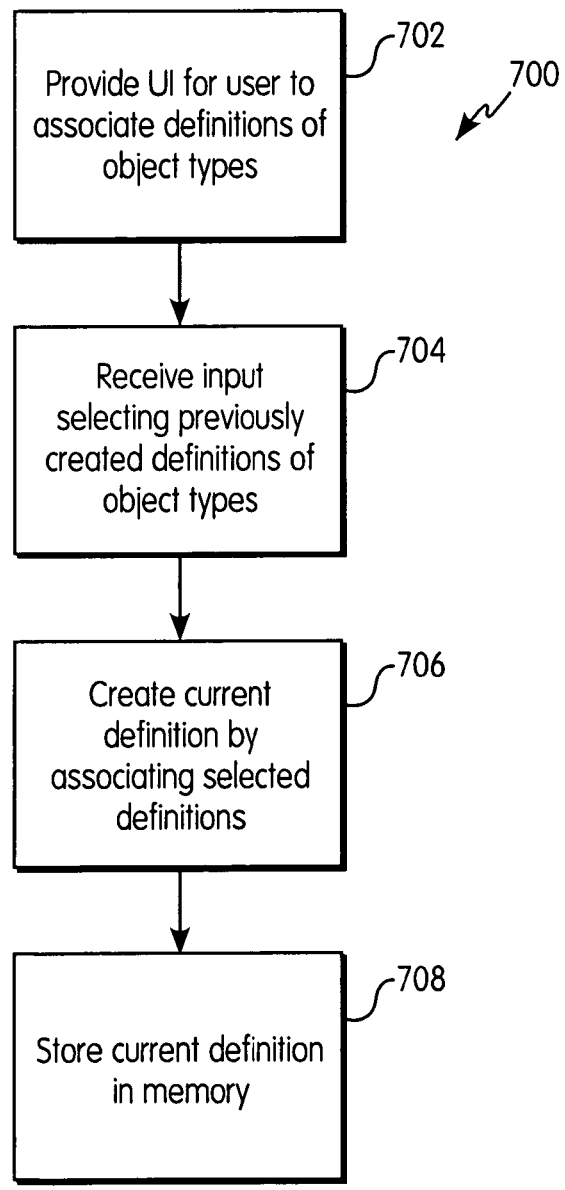
FIG. 7 shows another process for creating a definition of a business object type.

FIG. 7 shows another process 700 for creating a definition of a business object type by associating two or more object type definitions. The definition being created by process 700 will be referred to in the present specification as a current definition to distinguish it from previously created definitions. Process 700 can be performed, for example, by one or more components of the above-described framework 100.

The framework 100 provides a user interface that allows a user to create a current definition of a business object type by associating two or more previously created definitions of business object type (step 702). The user interface can include, for example, one or more tables that can be used to relate two or more previously created definitions. In particular, one table can lists previously created definitions and their respective GUIDs. Another of the tables can include a row, in which the inclusion of GUIDs of previously created definitions would create a new definition that is a combination of the definitions included in the row. Alternatively, the user interface can include the above described windows, one of which includes icons representing previously created definitions. A new definition can be created by dragging and dropping selected icons into the window that represents the business object type being defined. In one implementation, the framework provides in the user interface a list of definitions for simple business objects.

The framework receives user input selecting two or more previously created definitions (step 704). The selection can be effected as described above in reference to FIG. 5.

The framework creates the current definition in accordance with the user selection (step 706). The current definition is simply an association between the two previously created definitions. The framework stores the current definition in memory (step 708).

Optionally, the framework can include an interface to an external data object repository. The framework can use the interface, which can be a proprietary interface, to obtain, from the repository, definitions of object types, either by a process that abstracts a definition of an object type from existing definitions in the repository or by a process that simply imports definitions currently existing in the repository. A definition can be passed to the framework by using, for example, XML (extensible markup language) or WSDL (Web services description language) description formats. Once it obtains a definition of a business object type, the framework can generate items required to implement the object type.

As can be seen from the above discussion, the framework 100 provides functionalities that facilitate the creation of business object definitions at design time. In addition to these design time functionalities, the framework also provides functionalities that facilitate run time tasks, as will be further described below.

Figure 8:
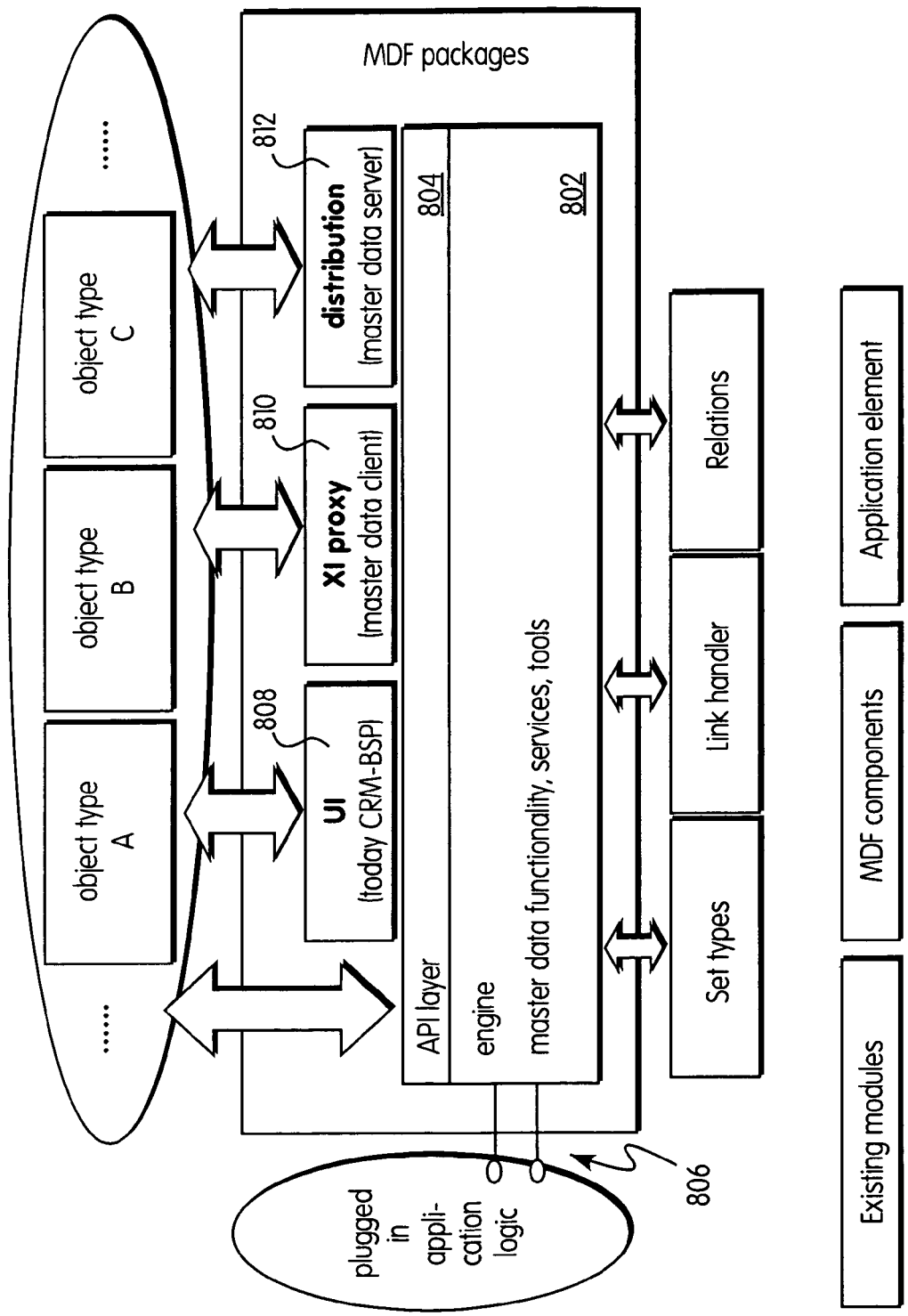
FIG. 8 shows an implementation of run time components of the framework.

FIG. 8 shows an implementation of run time components of the framework 100. The run time components include an engine 802, an API layer 804, an interface 806 for receiving plug-in application logic, and a user interface 808, all of which are described in the following paragraphs.

The engine 802 generally provides master data functionalities, services, and tools. It is the engine 802 that implements the services provided by the framework 100, examples of which are listed above in Table 1 and further described below in reference to FIGS. 9 and 10. Optionally, the engine 802 can import the master data functionalities, services, and tools from modules external to the framework 100. The modules can be those that were generated and used in a computing system of an enterprise before the framework 100 was implemented in the system.

The API layer 804 provides an interface to calling applications that are typically external to the framework. The API layer is configured to recognize definitions having the above-describe data model, that is, data model 200. Because all definitions created by using the framework adhere to such a data model, the API is compatible with these definitions, regardless of the type of business objects they define.

As mentioned above, the interface 806 allows the engine 802 to use plugged-in application logic. The engine 802 can use such logic, for example, to perform checks on data values for object instances.

The user interface 808 allows the engine to interact with a user to, for example, create definitions of business object types as described above in reference to FIGS. 5 and 7. The user interface can be graphical in nature.

Optionally, the run time components of framework 100 also include an exchange interface proxy 810 for implementing Web services and an interface 812 for implementation the distribution of master data. The exchange interface proxy 810 can be, for example, XI 3.0 available from SAP AG.

Figure 9:
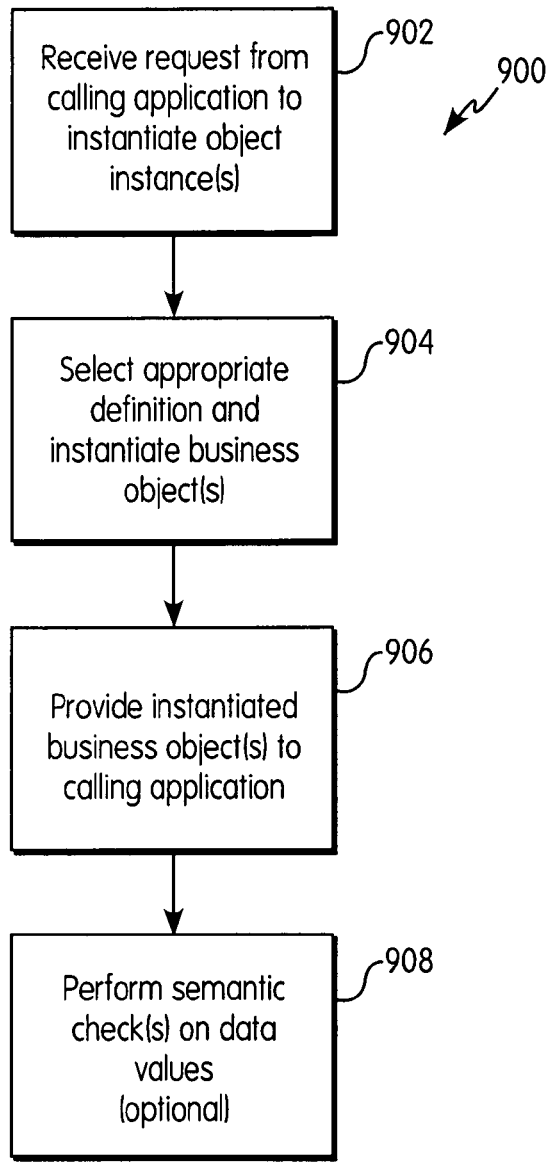
FIG. 9 shows a process in which a calling application uses the services of the framework to instantiate object instances.

FIG. 9 shows a process in which a calling application uses the services of the framework to instantiate object instances. The engine 802 receives a request from a calling application to instantiate an object type (step 902). The request, received through the API layer 804, specifies the type of business object to be instantiated. The request also provides data values for the instantiation. The calling application can be from any technology stack present in an enterprise system. The calling application can be, for example, one implemented by using an ABAP class. Alternatively, the calling application can be implemented in another object oriented programming language such as, for example, C++.

The engine selects the appropriate definition and instantiates the business object (step 904). Selection and instantiation can be done automatically, i.e., without requiring user input. The engine uses the values provided by the calling application to effect instantiation. Typically, instantiation includes generating one or more layers of a business object, including the above described kernel and the interface layer. Other layers that can be generated include, for example, an integrity layer and an access layer. The integrity layer represents the business logic of the object, including rules and constraints that apply to the object. The access layer defines the technologies, for example, COM/DCOM (component object model/distributed component object model) that can be used gain access to the object's data.

The engine provides the instantiated business object to the calling application (step 906). The instantiated object can be stored in a database external to the framework.

Optionally, the engine 802 can use application logic to perform semantic checks on data values (step 908). Examples of such semantic checks include, for example, ensuring that a data value falls within some expected range specified by business logic.

Figure 10:
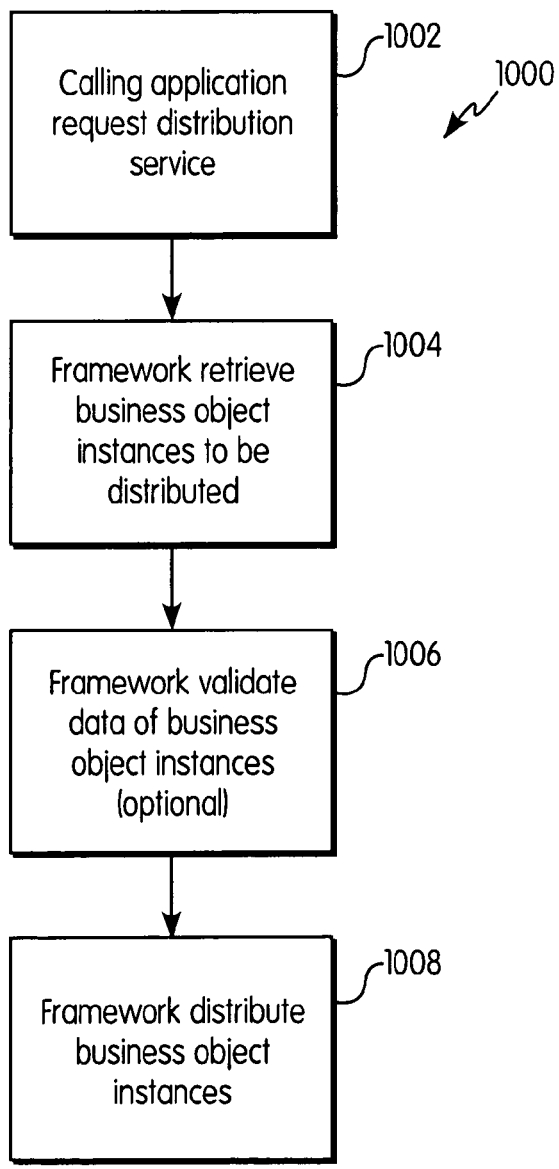
FIG. 10 shows a process in which a calling application uses the services of the framework to distribute master data.

FIG. 10 shows a process in which a calling application uses the services of the framework 100 to distribute master data. The calling application sends a request to the framework 100 for a service that distributes business object instances (step 1002). The requests specifies one or more particular business object instances. The request also specifies one or more destinations that is to receive the particular one or more business object instances. The destinations can be located within one enterprise system or, alternatively, among different enterprise systems. In response, the framework retrieves the business object instances (step 1004). Data representing the retrieved business object instances were validated during storage and, hence, typically does not require further validation. However, in cases where such data were not validated during storage or were subject to invalidation between storage and retrieval, the framework optionally performs checks on the business object instances (step 1006). The checks can include, for example, those that ensure the business objects instances are updated. As mentioned above, the semantics for the checks can be plug-ins to the framework. The framework distributes the business object instances to the destinations (step 1008).

The invention can be implemented in digital electronic circuitry, or in computer hardware, firmware, software, or in combinations of them. The invention can be implemented as a computer program product, i.e., a computer program tangibly embodied in an information carrier, for example, in a machine-readable storage device, for execution by, or to control the operation of, data processing apparatus, for example, a programmable processor, a computer, or multiple computers. A computer program can be written in any form of programming language, including compiled or interpreted languages; and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or an Web browser through which a user can interact with an implementation of the invention, or any combination of such back-end, middleware, or front-end components. The components of the system can be interconnected by any form or medium of digital data communication, for example, a communication network. Examples of communication networks include a local area network ("LAN"), a wide area network ("WAN"), and the Internet.

A number of implementations of the invention have been described. Nevertheless, it will be understood that various modifications may be made without departing from the spirit and scope of the invention. For example, an object class can be declared with modifiers that indicate whether the class is public, abstract, or final, a class name, a superclass name, and a list of the interfaces implemented by the class. Process steps can be performed in different order. Accordingly, other implementations are within the scope of the following claims.

What is claimed is:

1. A non-transitory machine-readable storage medium comprising instructions, which when implemented by one or more processors, cause the one or more processors to perform the following operations:
   receiving information describing a business object type; and
   in response to user input, creating a definition of the business object type, the definition being in accordance with a data model usable to define business object types, the data model being a standard data model used in an enterprise system, the definition of the business object type including an object key, the creating of the definition of the business object type including creating the object key in accordance with an object key of the data model.

2. The non-transitory machine-readable storage medium of claim 1, the enterprise system comprising a technology stack, the machine-readable medium further comprising instructions to cause the one or more processors to perform the following operation:
   providing an application programming interface that uses the data model to interface with calling applications from the technology stack.

3. The non-transitory machine-readable storage medium of claim 1, the enterprise system comprising a technology stack, the machine-readable medium further comprising instructions to cause the one or more processors to perform the following operation:
   in response to a request from a calling application from the technology stack, using the definition to create an instance of the business object type, the enterprise system further comprising a service executable, without further customization, on the instance.

4. The non-transitory machine-readable storage medium of claim 3, further comprising instructions to cause the one or more processors to perform the following operations:
   in response to a request from a calling application from a technology stack, executing a service on the instance.

5. The non-transitory machine-readable storage medium of claim 4, the service being to perform a business process.

6. The non-transitory machine-readable storage medium of claim 1, further comprising instructions to cause the one or more processors to perform the following operations:
   presenting a list of two or more definitions of business object types;
   receiving input selecting two or more definitions of business object types; and
   creating a new definition of a business object type, the new definition being a combination of the selected definitions of business object types.

7. The non-transitory machine-readable storage medium of claim 6, the presenting of the list comprising:
   presenting, in a window of a graphical user interface, two or more icons, each representing one of the two or more definitions of business object types; and
   presenting, in the window, an area representing the new definition of a business object type.

8. The non-transitory machine-readable storage medium of claim 7, the receiving of the input comprising:
   receiving input effected by dragging at least one of the two or more icons into the area representing the new definition of a business object type.

9. The non-transitory machine-readable storage medium of claim 1, further comprising instructions to cause the one or more processors to perform the following operations:
   presenting a list of one or more services;
   receiving input selecting one or more services; and
   associating the selected service with the definition of the business object type.

10. The method of claim 1, wherein the definition of the business object type includes an external key and wherein the creating the definition of the business object type includes creating the external key in accordance with an external key of the data model.

11. The method of claim 10, wherein the definition of the business object type includes a data set component and wherein the creating the definition of the business object type includes creating the data set component in accordance with a data set component of the data model, wherein the data set component describes attributes of the definition of the business object type.

12. The method of claim 10, wherein the definition of the business object type includes a relations component, wherein the creating the definition of the business object type includes creating the relations component in accordance with a relations component of the data model, and wherein the relations component describes a relation between a first business object instance a second business object instance.

13. A computer-implemented method, comprising:
   receiving information describing a business object type; and in response to user input, creating a definition of the business object type, the definition being in accordance with a data model usable to define business object types, the data model being a standard data model used in an enterprise system, the definition of the business object type including an object key, the creating of the definition of the business object type including creating the object key in accordance with an object key of the data model.

14. The method of claim 13, the enterprise system comprising a technology stack, the method further comprising:
providing an application programming interface that uses the data model to interface with calling applications from the technology stack.

15. The method of claim 13, the enterprise system comprising a technology stack, the method further comprising:
in response to a request from a calling application from the technology stack, using the definition to create an instance of the business object type, the enterprise system further comprising a service executable, without further customization, on the instance.

16. The method of claim 15, further comprising:
in response to a request from a calling application from a technology stack, executing a service on the instance.

17. The method of claim 16, the service being to perform a business process.

18. The method of claim 13, further comprising:
presenting a list of two or more definitions of business object types;
receiving input selecting two or more definitions of business object types; and
creating a new definition of a business object type, the new definition being a combination of the selected definitions of business object types.

19. The method of claim 18, the presenting of the list comprising:
presenting, in a window of a graphical user interface, two or more icons, each representing one of the two or more definitions of business object types; and
presenting, in the window, an area representing the new definition of a business object type.

20. The method of claim 19, the receiving of the input comprising:
receiving input effected by dragging at least one of the two or more icons into the area representing the new definition of a business object type.

21. The method of claim 13, further comprising:
presenting a list of one or more services;
receiving input selecting one or more services; and
associating the selected service with the definition of the business object type.

22. A system to implement a master data framework, comprising:
at least one processor;
a first component executable by the at least one processor to receive information describing a business object type; and
a second component in communication with the first component, the second component executable by the at least one processor to create, in response to user input, a definition of the business object type, the definition being in accordance with a data model usable to define business object types, the data model being a standard data model used in an enterprise system, the definition of the business object type includes an object key in accordance with an object key of the data model.

23. The system of claim 22, the enterprise system comprising a technology stack, the system further comprising:
a third component in communication with the first component and second component, the third component being to provide an application programming interface using the data model to interface with a calling application from a technology stack.

* * * * *